United States Patent Office 3,511,645
Patented May 12, 1970

3,511,645
PROCESSES FOR EXTRACTING METALS FROM ROCKS OR ORES
Juan C. Goni, Orleans, France, assignor to Bureau de Recherches Geologiques et Minieres, Paris, France
No Drawing. Filed June 8, 1967, Ser. No. 644,482
Int. Cl. C22b 3/00, 49/00, 35/00
U.S. Cl. 75—101                          4 Claims

ABSTRACT OF THE DISCLOSURE

Trace elements, especially metals, removed from rocks and low grade ores by mobilizing the trade elements by contact with sequestering, chelating and complexing agents, and separating the mobilized trace elements without destruction of the crystalline system of the host material. Simultaneous use of solutions of two or more chelating agents is preferred. Concurrent contact of rock or ore with 10% molar citric acid and oxalic acid solution is especially effective. It is preferred to contact rock or ore in a bed of granules with extracting solutions, e.g., undersaturated solution, which may be percolated through the bed with agitation.

BACKGROUND OF THE INVENTION

Field of the invention

The present invention relates to processes for the extraction of metals from rocks or ores, particularly metals contained in a very low content in plutonic, volcanic sedimentary and metamorphic rocks, or in poor quality ores, such contents never being more than a few gammas per gram. According to the invention, the extraction of metal elements contained in rocks having contents of this order, is effected by means of complexing or chelating agents. It was in fact discovered, during the application of the process which is the object of the invention, that the physical absorbtion mechanisms, accompanied by ion exchange phenomena, play a predominant part and that it is, therefore, possible, due to the invention, to mobilize the elements in traces and, more especially, metals in particular, without destroying the crystalline system of the "host" minerals.

SUMMARY OF THE INVENTION

Thus, the invention concerns a new process for the extraction of elements, of metals in particular, contained in very low concentrations in rocks or in poor quality ores, according to which the extraction is effected by means of complexing agents, and preferably by means of organic chelating agents.

The phenomenon of chelation is known per se. A chelated compound derives from the combination of a metal M with a substance which encloses two or more groups which yield electrons. A special type of internal complex of a cyclic nature is then obtained. These chelated complexes differ from ordinary non-cyclic complexes by the feature that in the latter there is only one group yielding electrons.

The cyclic or chelated complexes are particularly of interest, since they have remarkable stability. However, such complexes have never been exploited to remove traces of elements from rocks and minerals and, consequently, for extracting the metals without destroying the crystalline system of silicates.

According to another aspect of the invention, the new application of the phenomenon of chelation is effected by utilization of a mixture of two chelation agents which form with iron and aluminum, as also with almost all trace elements, especially of metals, very stable and water-soluble compounds.

By way of example, the two agents of simultaneous chelation selected are: oxalic acid and citric acid with a 10% molar concentration. In this manner, under the combined action of these two acids, solubilization of a certain number of trace elements is obtained, thus revealing the strong geochemical mobility of the majority of these elements.

Furthermore, this new process makes it possible to formulate a quantitative balance between the mobilized trace elements relative to the total existing, to study the attack of the silicates in such a chemical medium and to follow the variation in the weight of the extraction residue as a function of the duration of the tests.

In addition to the new application of the extraction chelation agents, the present invention also concerns the means of using these agents either by agitation or by percolation.

DETAILED DESCRIPTION OF THE INVENTION

By way of example, in the case of an extraction of trace elements, on a laboratory scale, the process is carried out as follows: 50 grams of the rock to be treated, the granulometry of which is between 0.1 and 0.3 mm., are placed in a polystyrene vessel of a rotary agitator.

25 ml. of each of the M/10 solutions of oxalic and citric acids are added and agitation is continued for 4 hours. The vessel is moved with a circular movement which causes rather intense mixing, dependent on the speed, and very close contact between the rock and the reagent. In order to increase turbulence, an automatic device causes reversal of the direction of rotation at predetermined moments. This reversal prevents particles from sticking to the walls. In the example indicated, the agitator, operating at ordinary temperatures, is driven at a speed of 80 r.p.m.

After agitation, the mixture is decanted, then most of the liquid is drawn off. The operation is repeated a number of times, three times in the example concerned, with preferably the same volume of reagents, i.e., 50 ml.

In this manner, the sample treated is brought into contact with 200 ml. of reagent which, after decanting, is centrifuged at 6,000 r.p.m. until a clear liquid is obtained containing almost all the metals in the rock.

When it is desired to pass from the laboratory scale to an industrial scale, the same process according to the invention is used, only the number of dimensions of the containers is changed to make the treatment of the rocks or ores automatic and continuous. One estimate of the results obtained by application of this new extraction process is given by comparative Table I, giving for three samples of granite of very distinct characteristics, the percentages extracted on the one hand, by means of mineral acids ($HNO_3$ N/100 and, on the other hand, by means of organic acids (mixture of citric acid and oxalic acid M/10).

TABLE I

| Elements | Sample No. 1 | | Sample No. 2 | | Sample No. 3 | |
|---|---|---|---|---|---|---|
| | OXAL | $HNO_3$ | OXAL | $HNO_3$ | OXAL | $HNO_3$ |
| Pb | 3.9 | 2.1 | 9.2 | 0.6 | 8.5 | 1.1 |
| Ga | 1.9 | 0.1 | 3.6 | 0.02 | 3.4 | 0.4 |
| Mn | 0.3 | 0.1 | 1.0 | 0.2 | 1.0 | 0.3 |
| Be | 5.0 | 1.7 | 17.3 | 1.1 | 12.4 | 5.0 |
| Mo | 7.5 | 4.7 | 31.1 | 0.1 | 6.2 | 0.3 |
| Sn | 8.4 | 1.7 | 12.5 | 0.1 | 8.5 | 0.04 |
| V | 4.2 | 0.9 | 11.5 | 1.6 | 3.6 | 1.1 |
| Cu | 11.9 | 2.5 | 20.0 | 3.5 | 19.2 | 1.1 |
| Ni | 6.5 | 1.8 | 35.4 | 6.9 | 3.7 | 0.6 |
| Co | 4.2 | 1.3 | 4.1 | 2.4 | 3.5 | 1.7 |
| Cr | 3.7 | 0.2 | 11.3 | 0.1 | 5.4 | 0.6 |

Tests effected on numerous other samples show that the extractions resulting from the application of the new process, that is to say, by organic chelation, are, with the same periods of agitation and volumes of reagents, five to six times greater than those obtained with nitric acid.

In particular, if the percentage of extraction (E%) is calculated as a function of the contents: $\gamma$/g. of the residue and of the rock, namely:

$E\% =$ $\dfrac{(\gamma/\text{g. of the residue}) \cdot (\text{weight of the residue of extraction}) \cdot 100}{(\gamma/\text{g. of the rock}) \cdot (\text{weight of treated sample})}$ the importance of the rate of extraction relatively to the original content is obvious, as shown by the following Table II, giving, respectively, for lead, chromium, tin, nickel and copper, the contents in $\gamma$/g. and the percentages of extraction E by organic chelation.

TABLE II

| Elements | Sample No. 1 | | Sample No. 2 | | Sample No. 3 | |
| --- | --- | --- | --- | --- | --- | --- |
| | $\gamma$/g. | E | $\gamma$/g. | E | $\gamma$/g. | E |
| Lead | 21 | 3.9 | 40 | 9.2 | 27 | 8.5 |
| Chromium | 54 | 3.7 | 7 | 11.3 | 45 | 5.4 |
| Tin | 15 | 8.4 | 19 | 12.5 | 59 | 3.5 |
| Nickel | 24 | 6.5 | 7 | 35.4 | 42 | 3.7 |
| Copper | 20 | 11.9 | 16 | 20 | 22 | 19.2 |

Comparative study of the weights of the organic residues and those originating from nitric washing shows that for the same sample, with the same granulometry, the weights of the residues obtained are consistently higher with organic acids. The contents in almost all the organic extracts are always higher than those of residues obtained by nitric corrosion.

The new process makes it obvious that most of the metals present in the rock are very mobile and, consequently, can easily be carried along by the weak reagents, and that certain elements: iron, aluminum, silicon, were practically always contained in the extracted residue. These major elements arise in part from the effect of mixing by agitation, which necessarily causes a dispersal of very fine particles in the colloidal state, but more especially from the washing of the microfissures.

Experiments which have been performed also show that there is no common measure between the solubilization of the trace elements, measured by the percentage of extraction, and the solubilization of the silicates, even when it is considered that all the silica, aluminum and iron originate from the corrosion of the minerals of which the rock is formed.

These laboratory experiments were performed, according to a second method of carrying out the process, according to the invention.

In this second method, all the factors which cause turbulence are eliminated, so that no variation in the size of granules of the fraction employed, 0.24 mm., for example, is produced and continual renewal of the reagent is effected by percolation, in this example. This necessarily causes an increase in the phenomenon of dissolution which depends, inter alia, on a number of fractionated percolations effected with a given total volume.

By way of example, an initial volume of 200 ml. of reagent is pumped at a speed of 0.1 ml./s. through 9 g. of granite supported by a 0.1 mm. nylon cloth. Every 21 days 100 ml. of the liquid is removed and is then centrifuged, dried, calcinated at 1000° and analyzed by spectography, the temperature on the rock bed being constant and equal to 35°.

In the experiment, which was carried out over a long period of time, in this instance thirty weeks, four reagents were used for comparison: a saturated solution of $Fe_2(SO_4)_3$ in $H_2SO_4 N$, a saturated solution of $NaHCO_3$, kept in flow of $CO_2$, a solution of $HNO_3$(N/10), and finally a solution of oxalic-citric chelation acids (M/10).

The variation in the weight of residue diminishes progressively after a maximum, and becomes asymptotic, as a function of the time.

The application of this new method gives results agreeing with those obtained by the extraction method accelerated by rotation of the reaction vessels already described.

Thus, experiments for successive exhaustion make it possible to extract a very high percentage of different metals and the systematic study of numerous altered or unaltered granite samples demonstrates the features and advantages of the extraction process.

Thus, the new process makes it possible to show:

(i) that the trace elements give proof of great geochemical mobility;
(ii) that they are bound to the support only by very weak force;
(iii) that they are very easily moved along by washing, specially with organic acids:chelation; and
(iv) that these elements are most frequently not expressed in the form of minerals.

Consequently, since these elements do not form part of the crystalline systems of the minerals, it is possible, owing to the application of the process, to extract metals contained in rocks, especially plutonic rocks, directly, by means of organic complexing or chelating agent without the intervention of any other preliminary corrosion process. This process is of special interest in regard to granite plutonic rocks, since they contain immense potential reserves of uranium, copper, lead, zinc, tin, molybdenum, vanadium, cobalt, lanthanides, etc.

The advantage of the invention for the recovery of metals contained in pit heaps or in materials extracted in the course of civil engineering: tunnels, canals, dams and the like, as also in mineral deposits extending over a wide area, but the content of which is too low to be treated by known processes, is therefore obvious.

The scope of the present invention includes the replacement of citric acid and oxalic acid by other chelation agents, for example, by dicarboxylic acids, aliphatic amines, aromatic amines, amino-acids, natural or synthetic peptides hydroxyl acids, condensed phosphates, nitroacids, salicyclic aldehyde and its derivatives, diketones, phenol compounds, complexons (EDTA) etc., and any sequestrating agent.

These compounds can be added directly, or in some cases indirectly, for example, by means of bacteria producing enzymes which terminate in these products.

Similarly, the concentration can be modified, as also the means for carrying out the process, without departing from the scope of the invention. It is, therefore, possible to use higher temperatures, more intense crushing, a longer period of contact between the rock and the organic reagents, the use of the counterflow principle between the solid and the reagent, more intense mixing or any factor increasing the speed and yield of the reaction.

I claim:

1. An extraction process for trace elements selected from the group consisting of lead, gallium, manganese, beryllium, molybdenum, tin, vanadium, copper, nickel, cobalt, and chromium, especially contained in low concentrations in rocks or in very poor quality ore raw material, by the mobilization of the trace elements, without destruction of the crystalline system of the "host" materials, which comprises contacting said raw material with a 10% molar solution of critic acid-oxalic acid, which form stable and water soluble reaction products with said trace elements and recovering the trace elements from the extraction medium.

2. An extraction process according to claim 1, in which said raw material is reduced to granular form to ensure close contact between said agent and the elements to be extracted.

3. An extraction process according to claim 1, in which close contact is obtained between said agent and the elements to be extracted by percolation of an under-saturated solution through a bed of said raw material.

4. An extraction process according to claim 1, in which close contact is obtained between said agent and the elements to be extracted by agitation of said raw material with an under-saturated solution.

References Cited

UNITED STATES PATENTS 2,896,930  7/1959  Menke _____ 75—101
3,091,526  5/1963  Fowler et al. _____ 75—121

OSCAR R. VERTIZ, Primary Examiner

H. S. MILLER, Assistant Examiner

U.S. Cl. X.R.

75—117, 119, 120, 121